US006916007B2

(12) United States Patent
deCler et al.

(10) Patent No.: US 6,916,007 B2
(45) Date of Patent: Jul. 12, 2005

(54) CLOSURE VALVE APPARATUS FOR FLUID DISPENSING

(75) Inventors: Charles Peter deCler, Stillwater, MN (US); Blaine C. Sturm, Coon Rapids, MN (US)

(73) Assignee: Colder Products Company, St. Paul, MN (US)

( * ) Notice: Subject to any disclaimer, the term of this patent is extended or adjusted under 35 U.S.C. 154(b) by 146 days.

(21) Appl. No.: 10/261,383

(22) Filed: Sep. 30, 2002

(65) Prior Publication Data

US 2003/0062498 A1 Apr. 3, 2003

Related U.S. Application Data

(60) Provisional application No. 60/364,659, filed on Mar. 14, 2002, and provisional application No. 60/326,025, filed on Sep. 28, 2001.

(51) Int. Cl.[7] ................................................. F16L 37/28
(52) U.S. Cl. ............................... 251/149.6; 251/149.8; 251/149.7; 137/614.19
(58) Field of Search ........................ 137/614.2, 614.03, 137/614.04, 614.19, 329.1, 329.2; 251/149–149.9

(56) References Cited

U.S. PATENT DOCUMENTS

| 4,564,132 | A | | 1/1986 | Lloyd-Davies |
| 4,862,918 | A | | 9/1989 | Schroeder ............... 137/614.19 |
| 5,494,073 | A | * | 2/1996 | Saito ..................... 137/614.03 |
| 5,857,596 | A | | 1/1999 | Lee |

FOREIGN PATENT DOCUMENTS

| EP | 0 112 938 A2 | 7/1984 |
| GB | 979821 | 1/1965 |
| GB | 1104697 | 2/1968 |

* cited by examiner

Primary Examiner—J. Casimer Jacyna
(74) Attorney, Agent, or Firm—Merchant & Gould P.C.

(57) ABSTRACT

A closure valve used in a fluid dispensing assembly. The closure valve contains a housing, poppet, sleeve, and a biasing member. The closure valve provides simplified sealing structures for preventing product leakage and spill. The sealing structures being integrally molded sealing structures.

12 Claims, 10 Drawing Sheets

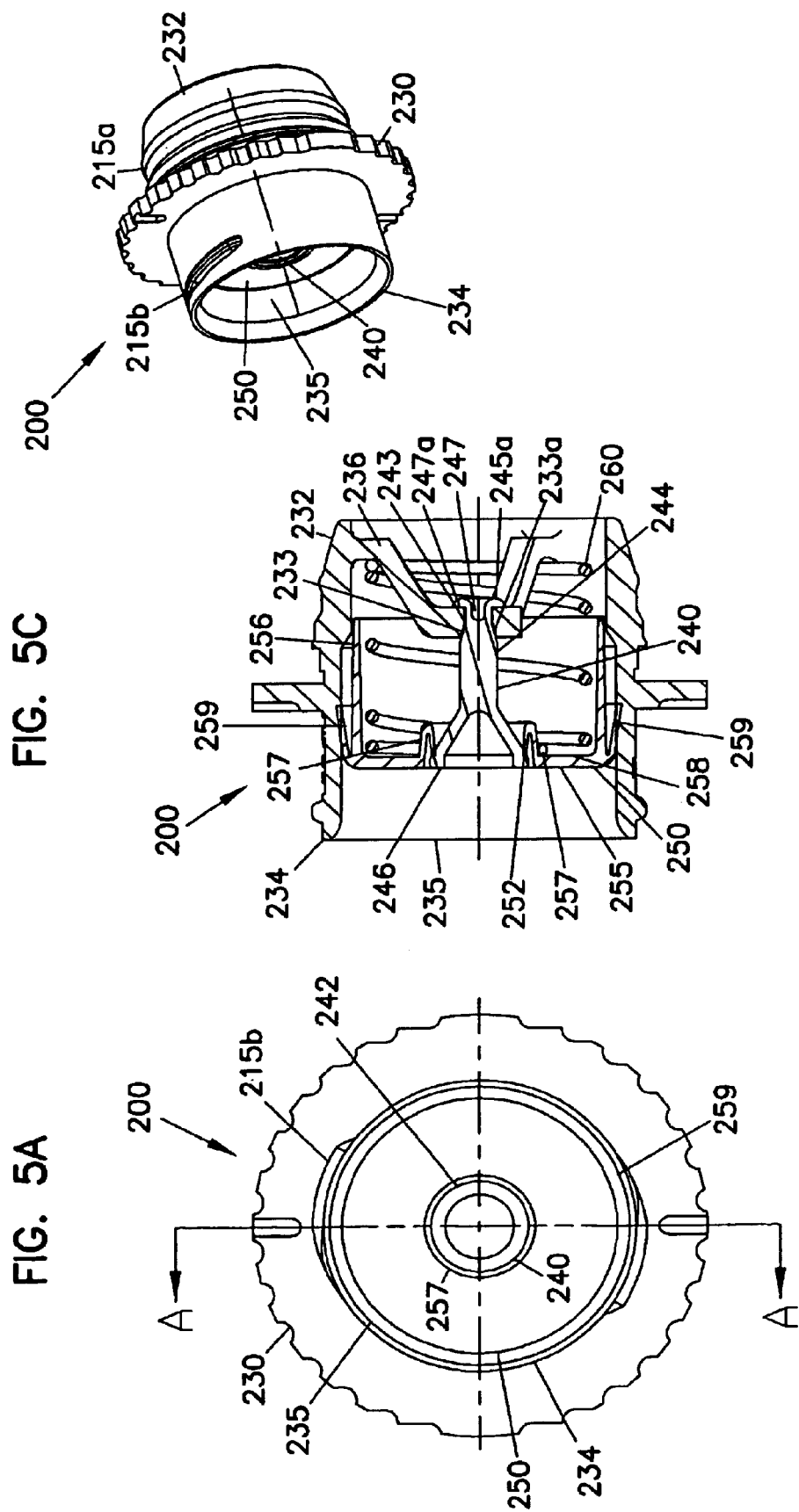

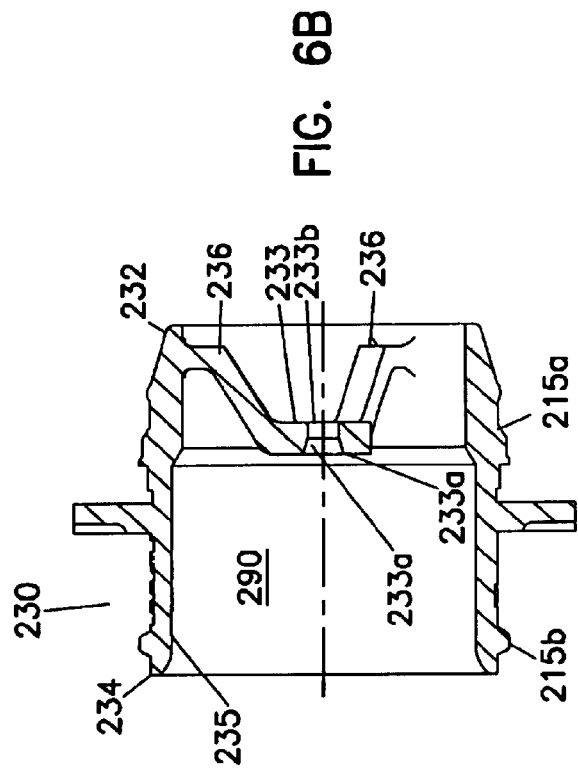
FIG. 6
FIG. 6B
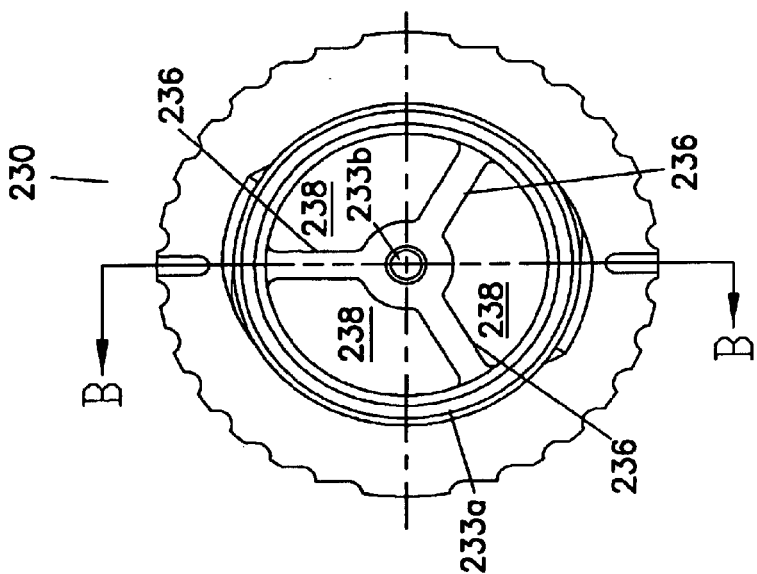
FIG. 6A

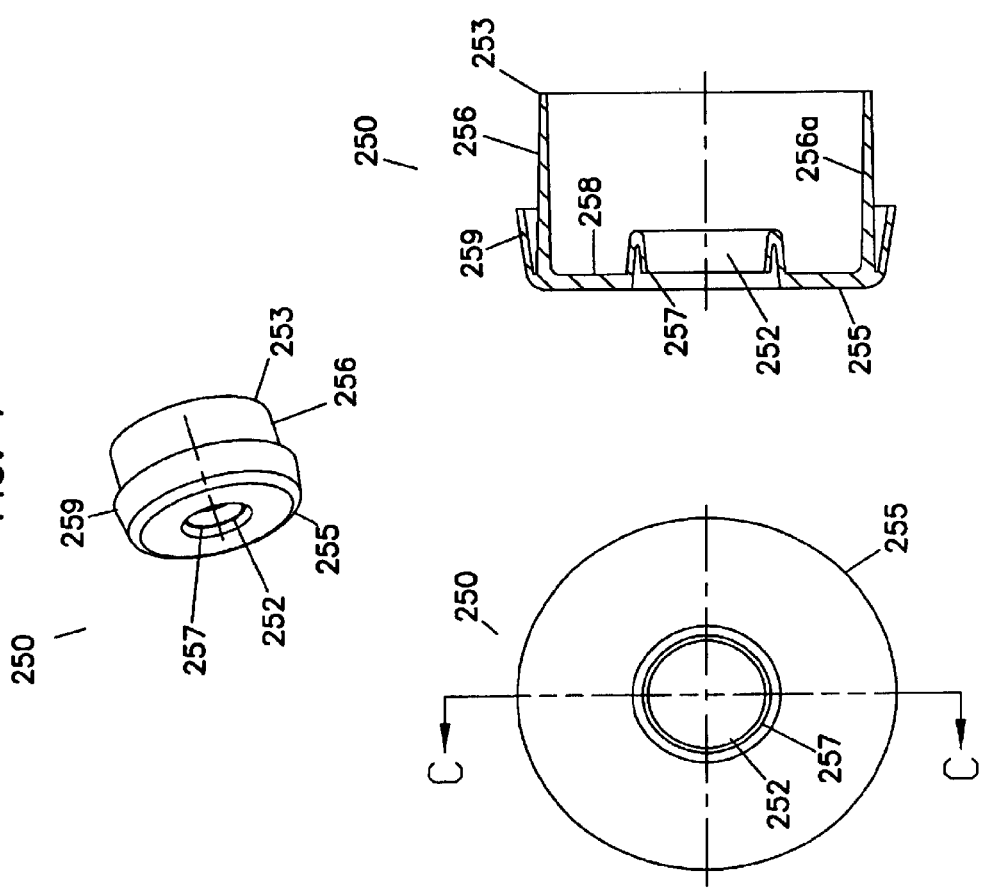

CLOSURE VALVE APPARATUS FOR FLUID DISPENSING

This application claims the benefit of U.S. Provisional Application Ser. Nos. 60/326,025, filed on Sep. 28, 2001 and 60/364,659, filed Mar. 14, 2002, both entitled CLOSURE VALVE APPARATUS FOR FLUID DISPENSING, both of which are incorporated herewith by reference in their entirety.

FIELD OF THE INVENTION

This invention is related to a closure valve for fluid dispensing. More particularly, this invention is related to a closure valve for powered dispensing, the closure having a simplified sealing structure.

BACKGROUND OF THE INVENTION

Closure valves used in fluid dispensing assemblies are well known and widely used. These closure valves and fluid dispensing assemblies may be used in powered dispensing and transfer of aggressive chemical media. Typically, closure valves may be attached to a fluid source, and are oftentimes connected to a coupling that may be attached to a fluid system, such as a fluid line. However, these closures often employ complicated sealing structures for providing an adequate seal in preventing product spill. In the past, elastomeric check valves, O-ring seals have been employed. Use of such seal types has brought erosion of the sealing material over time, and degraded the quality of the closure seal leading to product leak and/or spill and causing hazardous conditions. Furthermore, these closure valves are not cost effective, as multiple parts are required for assembly.

U.S. Pat. No. 4,564,132 to Lloyd-Davies discloses a diaphragmic container valve that permits a fluid dispensing passageway to be connected to a disposable container of fluid to provide continuous fluid flow. The diaphragmic container valve has a diaphragmic valve member that resiliently deflects from sealing engagement with a transverse wall of the container valve. Deflection of the diaphragmic valve member enables fluid flow through openings of the diaphragmic valve member and transverse wall. However, in addition to other shortcomings, this sealing configuration may bring erosion of the diaphragmic valve member over time, leading to a container valve with a degraded seal that can cause product leak and/or spill.

U.S. Pat. Nos. 5,911,403 and 5,975,489 to deCler et al. disclose a valve for dispensing fluids to and from a container. The valve of U.S. Pat. No. 5,911,403 is coupled with a coupler device having a stationary poppet member and moveable sleeve. When the coupler device is coupled with the valve, the moveable sleeve may be actuated from a normally closed position into an open position. The valve of U.S. Pat. No. 5,975,489 is coupled with a coupler device having a moveable poppet member. When the valve is inserted into the coupler device, the poppet members of the valve and the coupler may be actuated from normally closed positions to open positions enabling flow through the passageway. Although these devices may be suitable for their purposes, other developments have led to a need for an improved design.

Therefore, there is a need for an improved closure valve that maintains the integrity of a seal to prevent leaks and/or spill of product. Further, there is also a need for closure that can be produced in a cost effective manner using a minimum number of parts, while still providing a chemical resilient material.

SUMMARY OF THE INVENTION

In accordance with the present invention, the above and other problems were solved by providing a closure valve having an improved sealing structure.

In one embodiment of the present invention, a closure valve includes a housing having a first end and a second end. The housing defines a flow passageway extending longitudinally between the first and second ends. A poppet may be disposed within the flow passageway and retained within the housing. A sleeve defining an opening in fluid communication with the poppet and flow passageway may be disposed in the housing. The closure valve is actuated in an open position from a normally biased closed position through movement of the sleeve. The closure valve may be suitably attached to a fluid source at the first end of the housing, and suitably attached to a coupler at the second end of the housing.

In one embodiment of the present invention, a closure valve includes a housing having a first end and a second end. The housing defines a flow passageway extending longitudinally between the first and second ends, and the housing includes a sealing structure formed about a sidewall of the housing and disposed between the first and second ends. A poppet may be telescopically engaged with the first end of the housing, and retained within the housing. The poppet includes a first end and a second end having an elongated member therebetween. The first end defines a plurality of openings in fluid communication with the flow passageway of the housing. The second end and elongated member extend coaxial to the flow passageway. A sleeve defining a first end and a second end may be telescopically insertable into the second end of the housing, and having an outer surface in fluid tight seal with the sealing structure of the housing. The second end of the sleeve includes an opening in fluid communication with the flow passageway and openings of the poppet. The sleeve also includes a sealing member that forms a fluid tight seal with the second end of the poppet and retains the sleeve within the housing. The sleeve may be biased such that the closure is in a normally closed position and is actuatable into an open position. The closure may be suitably attached to a fluid source at the first end, and suitably attached to a coupler at the second end.

In one embodiment, the housing includes a retaining structure for retaining the poppet member. Preferably, the retaining structure includes an aperture, and is connected to the housing through a plurality of leg portions extending radially from the retaining structure to the housing.

In one embodiment, the housing includes a sealing structure for forming a fluid tight seal with the sleeve. Preferably, the sealing structure is an integrally molded lip seal.

In one embodiment, the poppet member includes a hole defining a side surface proximate a first end of the poppet member. The hole and side surfaces form a welded end when the poppet member is retained within the housing.

In one embodiment, the sleeve includes both a sealing structure for forming a fluid tight seal with the housing, and a sealing member for forming a fluid tight seal with the poppet member.

In one embodiment a sealing member of the sleeve may be an integrally molded lip seal.

In one embodiment, a sealing structure of the sleeve may be an integrally formed lip seal.

In one embodiment a sealing member of the sleeve may be formed of a flexible plastic material, and the poppet may be formed of a rigid plastic material. The sleeve and the poppet communicate in a plastic on plastic configuration providing a suitable seal.

In another embodiment of the present invention, the closure valve may be disposable.

In another embodiment of the present invention, the closure valve may be an injection molded material.

In one embodiment of the present invention, a fluid dispensing assembly includes a closure valve and a coupler. The closure valve includes a housing, a poppet, and a sleeve. The housing has a first end and a second end and defines a flow passageway extending longitudinally between the first and second ends. The poppet may be disposed within the flow passageway and retained within the housing. The closure valve may be actuated in an open position from a normally biased closed position. The closure valve may be suitably attached to a fluid source at the first end, and suitably attached to a coupler at the second end. The coupler defines a flow passage through a first end and an opening. The first end may connect to the closure valve in a fluid tight seal, and contains a coupler member in contact with the poppet of the closure valve when the closure valve and coupler are connected. The opening may be suitable for attachment with a fluid system. The coupler includes a biasing member that biases the coupler member in a normally closed position when not connected with the closure, and may be actuated in an open position when connected with the closure.

The present invention provides a closure valve with simplified sealing structures. The plastic on plastic configuration of the poppet and the sleeve having the sealing member, such as a flexible lip seal that may be integrally molded with the sleeve, provides an adequate seal. This configuration may prevent the closure from degradation and erosion thus preserving the seal properties of the closure and its overall function. In addition, the integrally molded seal allows the closure valve to be produced in a cost effective manner as the parts required for assembly is reduced. In addition, the closure of the present invention also may be disposable after use. The sealing member retains the closure with an adequate seal when in the closed position. Such a configuration prevents spill of product from the fluid source or product left in the flow passageway of the closure valve without the need for external sealing parts.

These and other various advantages and features of novelty, which characterize the invention, are pointed out in the following, detailed description. For better understanding of the invention, its advantages, and the objects obtained by its use, reference should also be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5 represents a perspective view of another embodiment of a closure in accordance with the principles of the present invention.

FIG. 5A represents an end view of the closure of FIG. 5.

FIG. 5C represents a sectional view of the closure of FIG. 5 taken from line A—A of FIG. 5A showing an embodiment of a poppet member in a retained position.

FIG. 6 represents a perspective view of one embodiment of a housing for the closure of FIG. 5 in accordance with the principles of the present invention.

FIG. 6A represents an end view of the housing of FIG. 6.

FIG. 6B represents a sectional view of the housing of FIG. 6 taken from line B—B of FIG. 6A.

FIG. 7 represents a perspective view of one embodiment of a sleeve for the closure of FIG. 5 in accordance with the principles of the present invention.

FIG. 7A represents an end view of the sleeve of FIG. 7.

FIG. 7B represents a sectional view of the sleeve of FIG. 7 taken from line C—C of FIG. 7A.

DETAILED DESCRIPTION OF THE PREFERRED EMBODIMENT

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

Figure 1:
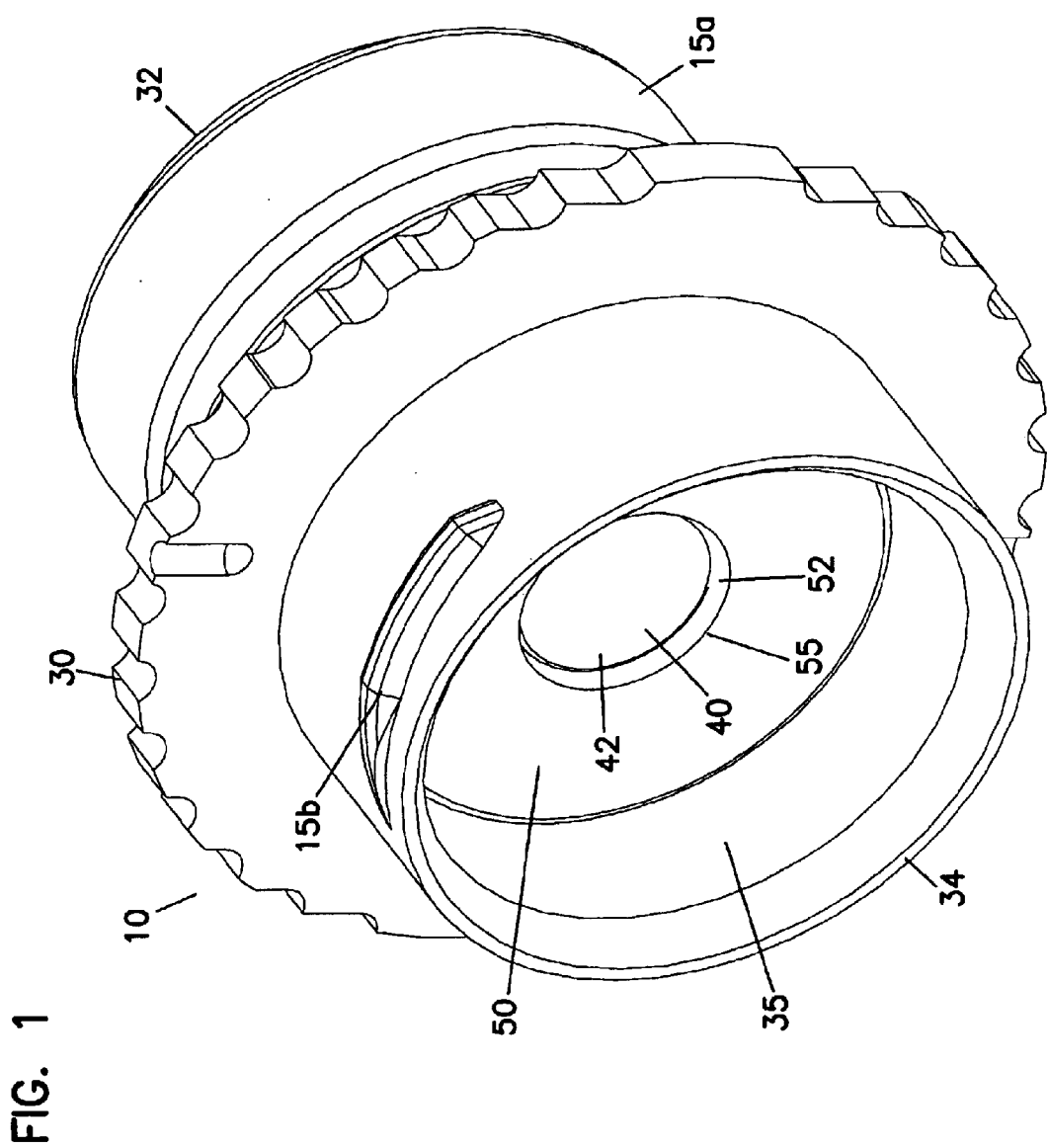
FIG. 1 represents perspective view of one embodiment of a closure in accordance with the principles of the present invention.
Figure 2:
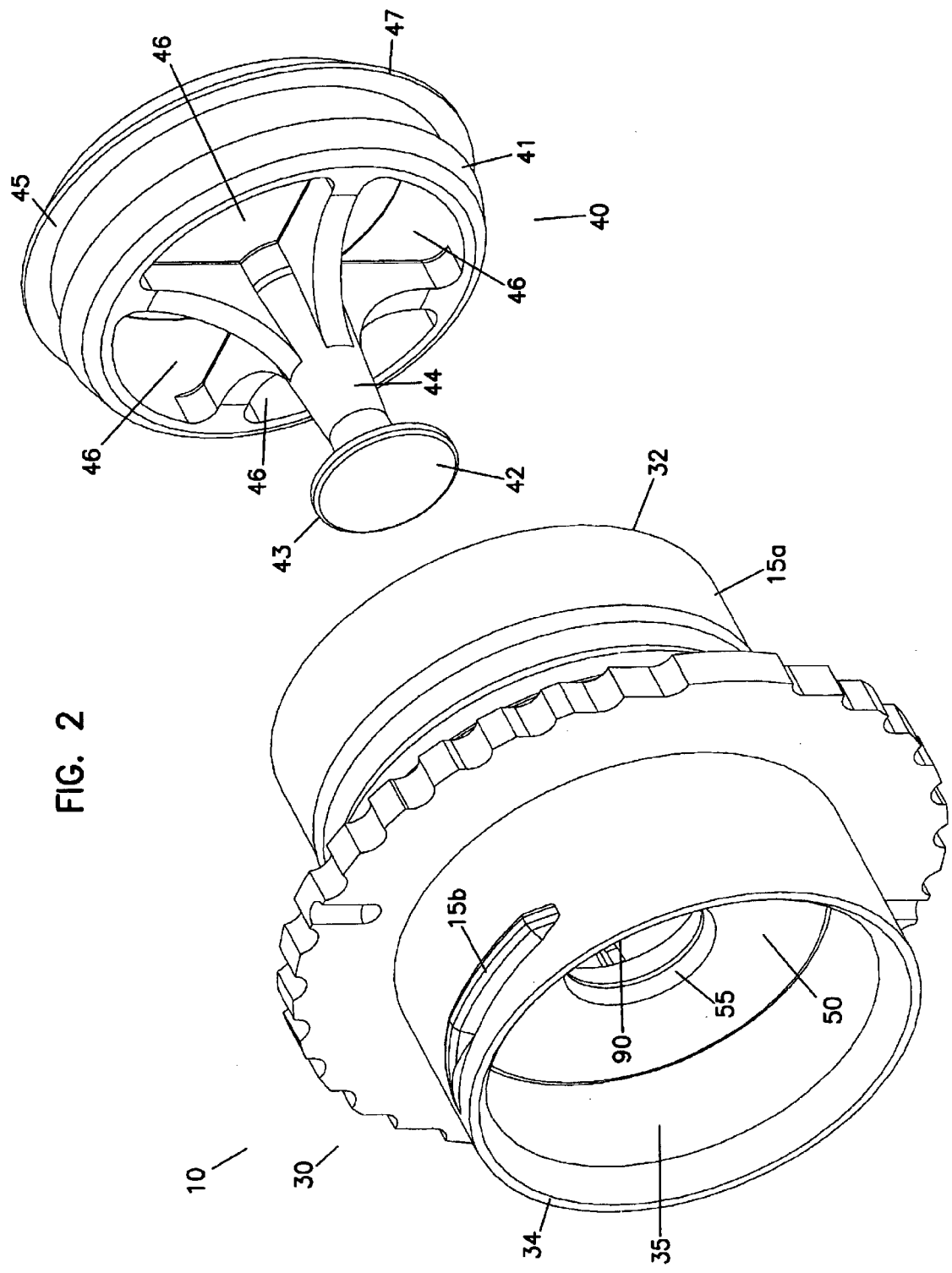
FIG. 2 represents a partially exploded perspective view of the closure of FIG. 1 in accordance with the principles of the present invention.
Figure 3:
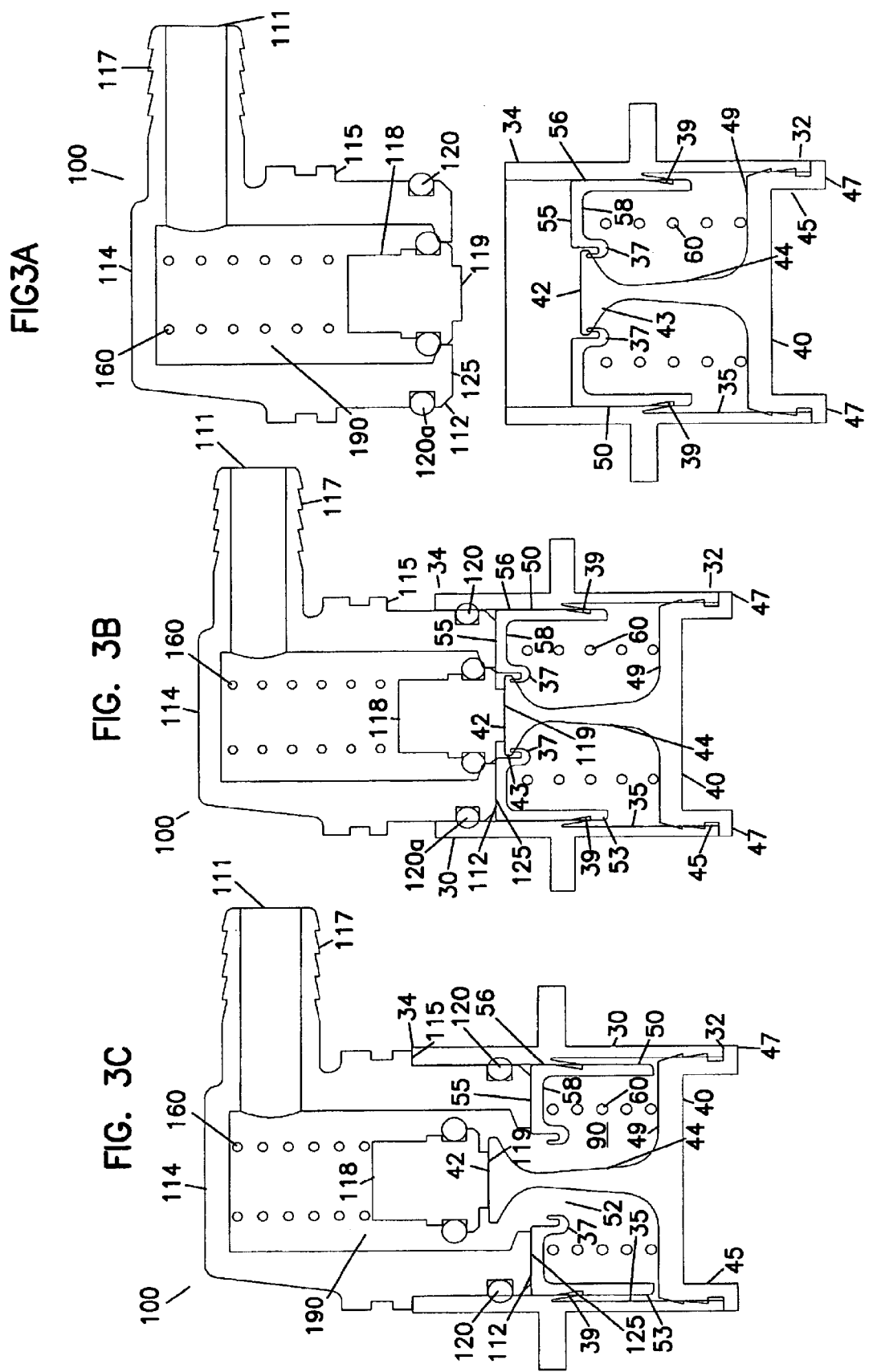
FIG. 3A represents a cross sectional view of one embodiment of a closure in accordance with the principles of the present invention in a closed position, and one embodiment of a coupler in a closed position in accordance with the principles of the present invention. The closure and the coupler represent a relationship before connection.
FIG. 3B represents a cross sectional view of the closure of FIG. 3A connected to the coupler of FIG. 3A in accordance with the principles of the present invention. The closure and the coupler represent an initially connected or pre-coupled relationship.
FIG. 3C represents a cross sectional view of the closure and coupler of FIG. 3A–B coupled together showing both the closure and the coupler in an open position in accordance with the principles of the present invention.

FIGS. 1 and 2 illustrate a first preferred embodiment of a closure 10 including a housing 30 having a first end 32 and a second end 34. A flow passage 90 (shown in FIGS. 3A–C) may be defined longitudinally through and between the first end 32 and the second end 34. The housing 30 includes a sealing structure 39 (shown in FIGS. 3A–C) formed about a sidewall 35 of the housing 30 and disposed between the first and second ends 32, 34. The sealing structure 39 may be integrally formed onto the housing 30. Preferably, the sealing structure 39 is an integrally molded lip seal as shown in FIGS. 3a–c. Preferably, the sealing structure 39 is a flexible seal.

A poppet 40 is telescopically insertable into the first end 32 of the housing 30. The poppet 40 may be engaged at the first end 32 of the housing 30 and retained within the housing 30. As shown in FIGS. 1–3C the poppet 40 may include an integrally molded barb 41 allowing the poppet 40 to be suitably retained within the housing 30. It will be appreciated that the barb 41 is merely exemplary, as other well known retaining structures may be suitably employed to accomplish an interference fit for retaining the poppet within the housing. The poppet 40 includes a first end 45 and a second end 43 having an elongated member 44 therebetween. The first end 45 defines a plurality of openings 46 in fluid communication with the flow passage 90 of the housing 30. The second end 43 and elongated member 44 extends coaxial to the flow passage 90. The second end 43 and the elongated member 44 also may be disposed at a center of the flow passage 90.

A sleeve 50 defining a first end 53 and a second end 55 is telescopically insertable into the second end 34 of the housing. The sleeve 50 includes an outer surface 56 in fluid tight seal with the sealing structure 39 of the housing 30. It will be appreciated that a sealing structure, such as sealing structure 39 on the housing 30, may instead be formed on the outer surface 56 of the sleeve 50 rather than on the housing 30 (see 59 in FIGS. 7–7B) so as to properly seal with the sidewall 35 of the housing 30. It will also be that both the sleeve 50 and the housing may include sealing structures as above for contacting with the respective sidewalls 25, 56 for providing a suitable seal. The second end 55 includes an opening 52 in fluid communication with the flow passage 90 and forming a fluid tight seal with the second end 43 of the poppet 40.

The opening 52 includes an integrally molded sealing member 37. Preferably, the sealing member 37 is a flexible sealing member that provides a fluid tight seal between the second end 43 of the poppet 40 when the closure 10 is in a closed position. Preferably, the sealing member 37 is a lip seal. The sealing member 37 also retains the sleeve 50 within the housing 30 by an interference fit. That is, the sleeve 50 is retained within the housing 30 when the sealing member 37 is in contact with the second end 43 or head of the poppet 40. Preferably, assembly of the sleeve 50 is accomplished by a snap fit, by forcibly inserting the sleeve through the second end 34 of the housing 30 and overcoming the interference between the opening 52 including the sealing member 37 of the sleeve 50 and the diameter of the second end 43 of the poppet 40. Preferably, the force required to assemble the sleeve 50 may be higher than the forces resulting from hydraulic pressure of a fluid against the sleeve 50, so that the sleeve 50 is properly retained.

The housing 30, poppet 40, and sleeve 50 may be formed of chemically resistant material suitable for aggressive chemical fluid flow. Further, the housing, poppet, and sleeve may be injection molded. In addition, the sleeve 50 may be formed of a flexible plastic material as opposed to the poppet 40, which may be formed of a rigid plastic material. This plastic on plastic configuration, defined by the sealing member 37 of the sleeve 50 and the second end 43 of the poppet 40, allows the integrity of the seal within the components of the closure to be maintained.

It will be appreciated that any suitable combination of a flexible plastic material against a rigid plastic material may be employed for accomplishing suitable contact between the sleeve and poppet to provide a proper seal. For instance, the sleeve 50 may be formed of a flexible plastic material, such as but not limited to low density polyethylene, in order to provide the resilient flexible sealing member 37. Further, any suitable rigid plastic material well known maybe employed for the poppet member and housing structures. Such a configuration prevents spill of product from a source, and prevents leakage and/or spill of product still remaining within the passageway of the closure valve when the closure and the coupler are disconnected. The plastic on plastic configuration also prevents degradation of the seal and can eliminate the need for separately attached sealing structures, such as resilient o-rings. Further, a convenient and cost effective closure may be provided, that is made of plastic and has integrally formed sealing members and structures and a minimum number of parts required for assembly.

In the embodiment shown in FIGS. 1–3C, the sleeve 50 is movable so that the closure can be actuated in an open position from a normally biased closed position. The sleeve 50 is pushed towards the first end 32 of the closure 10 upon insertion of the coupler 100. The flow passage 90 may be actuated to allow fluid flow by opening the seal between the second end 43 of the poppet and the sealing member 37 of the second end 55 of the sleeve 50 at the opening 52. The poppet 40 remains stationary and includes a first biasing surface 42 at the second end 43 for butting against another surface, such as a coupler member of a coupler device, when coupled to a piece of dispensing equipment (discussed below). A retention portion 47 may engage the first end 32 of the housing 30 such that movement of the poppet 40 into the housing 30 may be restricted and the poppet 40 can remain in a stationary position. A biasing member 60 may be disposed between an internal surface 58 of the sleeve 50 and a seating surface 49 of the poppet 40. The biasing member 60 may be, but is not limited to a coiled spring. The biasing member 60 biases the sleeve 50 toward the second end 34 of the housing 30 so that the closure 10 is in a normally closed position, and the sleeve 50 is movable so as to actuate the closure 10 into an open position. In the open position, fluid flow is allowed through the flow passage 90, such as when the closure 10 is coupled to a piece of dispensing equipment such as a coupler device 100 in FIGS. 3A–C.

Figure 4:
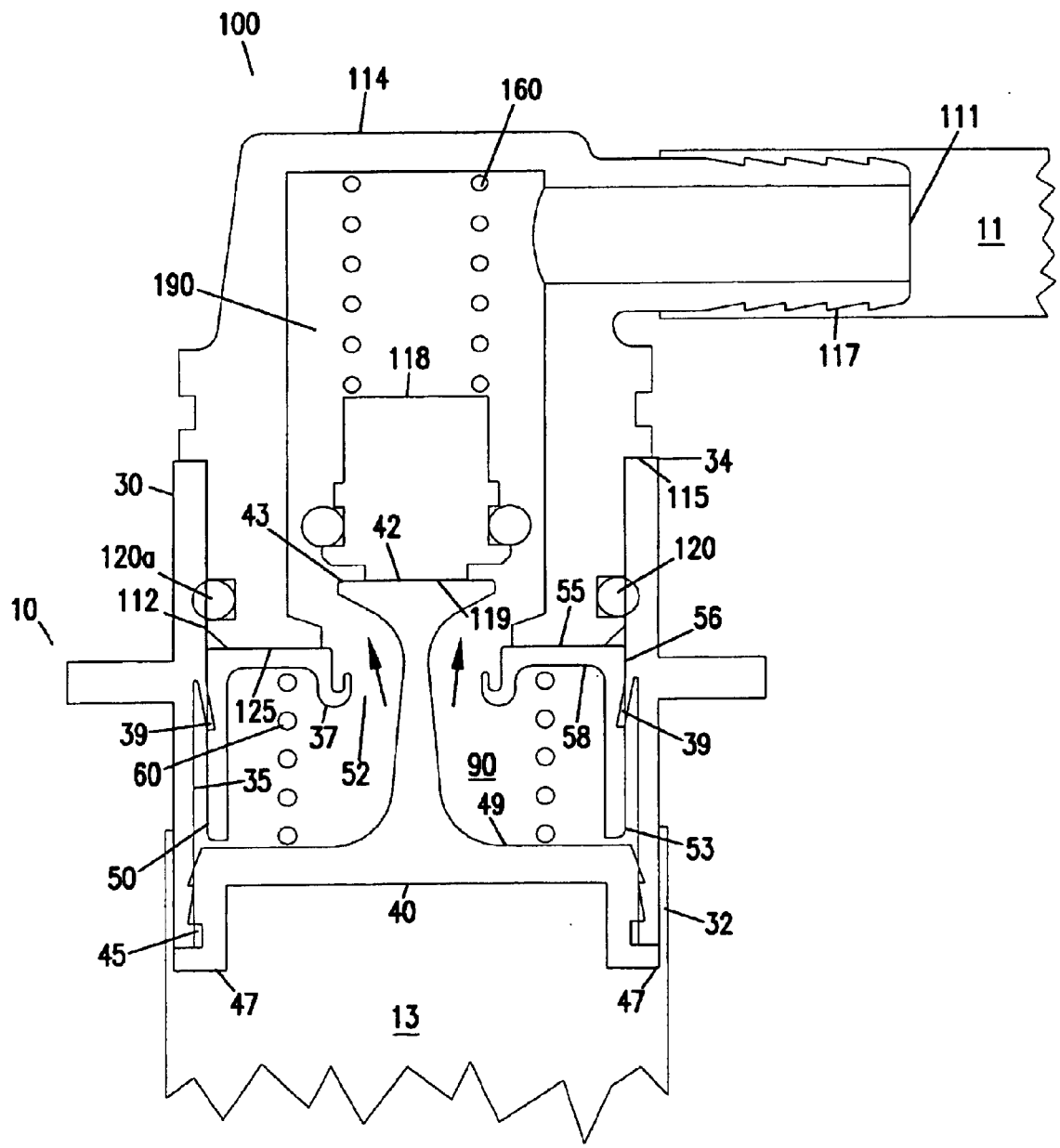
FIG. 4 represents a cross-sectional view of the closure and the coupler of FIG. 3A–C attached to a fluid source and a fluid system.

The closure 10 may be suitably attached to a fluid source at the first end 32, and suitably attached to a coupler at the second end 34 (shown in FIG. 4). As shown in FIGS. 1 and 2, external thread portions 15a, 15b illustrate means for attaching to a fluid source, and fluid system, respectively. It will be appreciated that alternatives to the external threads shown in FIGS. 1 and 2 also may be employed.

FIGS. 3A–C illustrate the closure in relation to a coupler 100. FIG. 3A shows the closure 10 before connection to the coupler 100. The closure 10 and the coupler are in closed positions. FIG. 3B shows the coupler 100 partially inserted into the second end 34 of the closure 10 into a butting relationship with the poppet 40. FIG. 3C illustrates the closure 10 being coupled with the coupler 100 with both the closure 10 and the coupler 100 in an open position. Similar features of the closure 10 have been detailed and described above, are not further discussed.

In the coupled state, shown in FIG. 3C, the coupler 100 is pushed into the second end 34 of the housing 30, thereby pushing the sleeve 50 towards the first end 32 of the housing 30. An o-ring groove 120 having an o-ring 120a therein may be disposed toward the first end 112 such that the coupler 100 and the closure 10 are in a fluid tight seal when connected. The o-ring groove 120 illustrated is merely exemplary, and it will be appreciated that other seals between the coupler 100 and the closure valve 10 also may be employed. The coupler 100 defines a first end 112 and a second end 114. The coupler includes a flow passage 190 disposed between the first end 112 and the second end 114. A coupler, member 118 may be biased in a normally closed position by a biasing member 160, such as but not limited to the coiled spring shown in FIGS. 3A–C.

When not coupled to the closure 10, the coupler member 118 is normally biased toward the first end 112 by the biasing member 160, so that the coupler 100 is in a closed position and the flow passage 190 of the coupler is closed. In the coupled state, the coupler member 118 is movable so as to actuate the coupler 100 into an open position by butting with and pushing against the poppet 40 of the closure 10 when the coupler 100 and closure 10 are being connected. Thus, the coupler 100 is actuated into an open position, thereby opening the flow passage 190. As shown in FIG. 3C, as the coupler 100 is pushed inwards through the second end 34 of the closure 10, the biasing surface 42 of the poppet 40 comes to a butting relationship with a head surface 119 of the coupler member 118 and pushes the coupler member 118 and the biasing member 160 inwards toward the second end 114. Simultaneously, the sleeve 50 would be pushed towards the first end 32 of the housing 30 by a surface 125 of the first end 112 of the coupler 100. In this configuration, the flow passages 90 and 190 are actuated in open positions, thereby allowing fluid flow through the closure 10 and coupler 100. Stop portion 115 limits the extent to which the coupler 100 may enter the second end 34 of the closure 10.

The coupler may have an opening 111 suitable for attachment with a fluid system such as, but not limited to a fluid line. The opening may be a barbed structure 117.

FIG. 4 illustrates the closure 10 being suitably attached to a fluid source 13, and the coupler 100 being suitably attached to a fluid system 11, such as but not limited to a fluid line. Similar features for a closure and a coupler illustrated in FIG. 4 have been described above and are not further detailed.

FIGS. 5–9B illustrate another preferred embodiment of a closure 200 including a housing 230, a sleeve 250, a poppet member 240, and a biasing member 260. As shown in FIGS. 5–5C, the closure 200 is assembled. FIGS. 5–5A illustrate the housing 230 having a first end 232 and a second end 234, where the ends 232, 234 define a flow passage 290 (best shown in FIGS. 6–6B) longitudinally therethrough. The first end 232 is suitable for attachment with a fluid source, such as fluid source 13 illustrated in FIG. 4. Preferably, the first end 232 includes a barbed configuration 215a about an outer surface of the first end 232 for connecting with a fluid source. It will be appreciated that other mating configurations may be employed to connect the closure 200 to a fluid source, for instance a threaded connection. Likewise, the second end 234 is suitable for connecting to a mating coupler (such as 100 illustrated in FIGS. 3–4). FIGS. 5–5A and 6–6B illustrate the second end having a threaded portion 215b. It will be appreciated that other mating configurations may be employed to connect the closure 200 to a coupler.

The sleeve 250 is telescopically inserted into and resides about the sidewall 235 of the housing 230. The poppet member 240 is inserted within the housing 230 and is retained within the housing 230 in a stationary position (best shown in FIG. 5C). The sleeve 250 is movable within the housing 230 along the sidewall 235, the details of which will be described below. FIG. 5A illustrates the closure 200 further showing the second end 234 of the housing 230, and the sleeve 250 and poppet member 240 inserted within the housing 230.

Figure 5B:
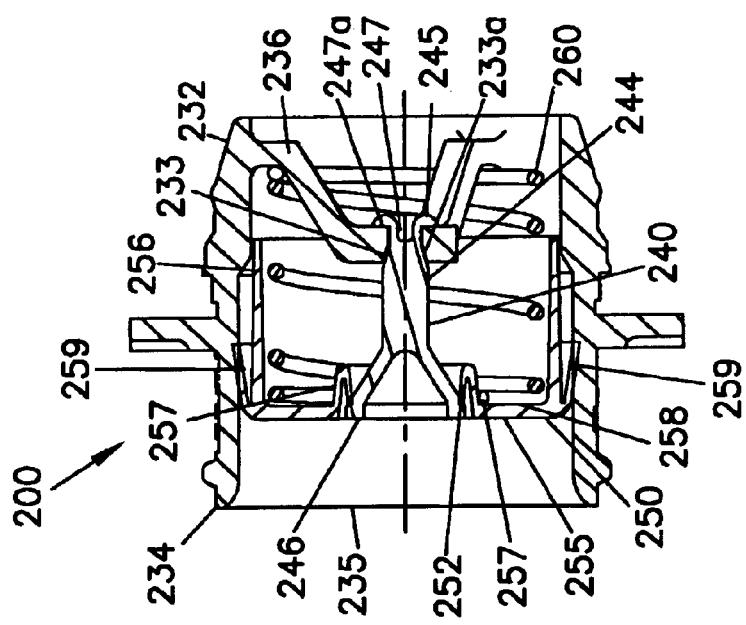
FIG. 5B represents a sectional view of the closure of FIG. 5 taken from line A—A of FIG. 5A showing an embodiment of a poppet member before it is retained.
Figure 8A:
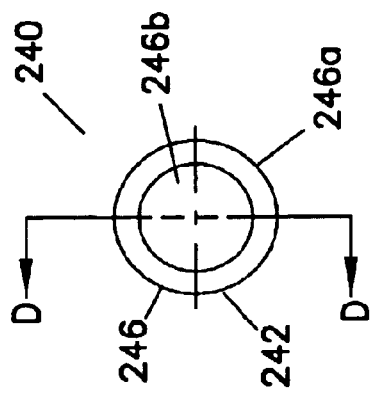
FIG. 8A represents an end view of the poppet of FIG. 8.
Figure 8:
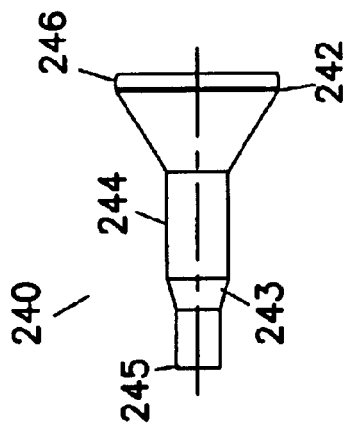
FIG. 8 represents a side view of one embodiment of a poppet member for the closure of FIG. 5 in accordance with the principles of the present invention.
Figure 8B:
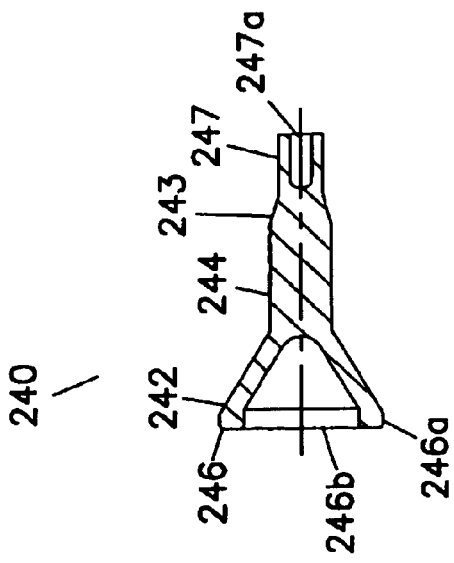
FIG. 8B represents a sectional view of the poppet member of FIG. 8 taken from line D—D of FIG. 8A.
Figures 9, 9A:
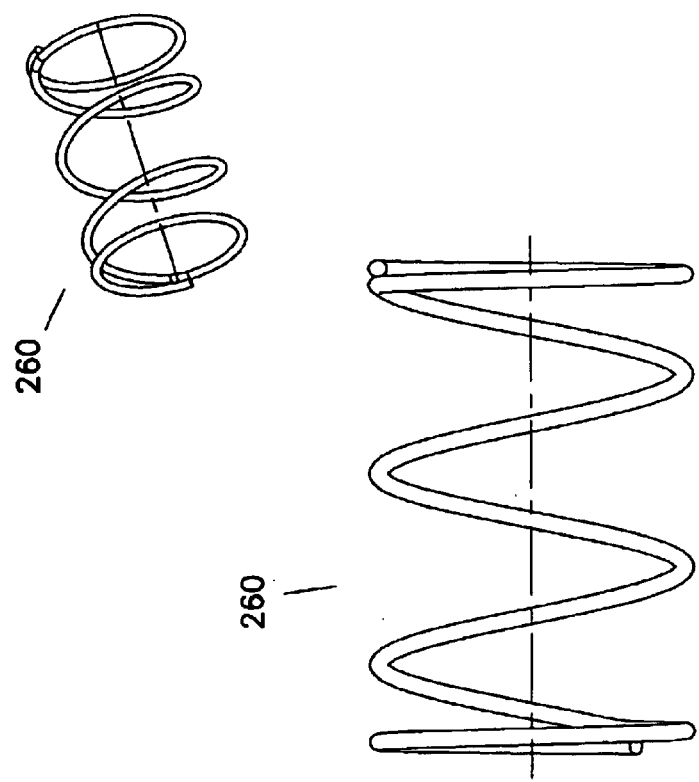
FIG. 9 represents a perspective view of one embodiment of a biasing member in accordance with the principles of the present invention.
FIG. 9A represents a side view of the biasing member of FIG. 9.

FIGS. 5B–5C illustrate sectional views of the closure 200. The housing 230 includes a retaining structure 233 disposed between the ends 232, 234 and within the flow passage 290. Preferably, the retaining structure 233 includes an aperture 233b therethrough (FIG. 6B) and defining a tapered surface 233a, and extends coaxial to the flow passage 290. The tapered surface 233a of the aperture 233b has a diameter proximate the second end 234 of the housing 230 that is larger than a diameter proximate the first end 232 of the housing 230 (best shown in FIG. 6B). A plurality of leg portions 236 connect the retaining structure 233 to the housing 230, and extend radially outward from the retaining structure 233 to the housing 230. The leg portions 236 define a plurality of openings 238 proximate the first end 232 of the housing 230 that are in fluid communication with the flow passage 290.

The poppet 240 includes a first end 245 and a second end 246 with an elongated member 244 extending therebetween. Proximate the first end 245, the poppet member 240 includes a tapered surface 243 defined on an outer surface of a portion of the elongated member 244 proximate the first end 245. As shown in FIGS. 5B and 5C, the tapered surface 243 cooperates with the tapered surface 233a defined by the aperture 233b of the retaining structure 233 to connect the poppet member 240 to the housing 230. The tapered surfaces 233a, 243 are arranged and constructed such that the poppet member 240 is insertable into the retaining structure 233 through the second end 234 of the housing 230 toward the first end 232 of the housing 230. The tapered surfaces 233a, 243 allow limited insertion of the poppet member 240 into the aperture 233b of the retaining structure 233. The first end 245 includes a hole 247 defining an inner side surface 247a, the details of which will be discussed below. The second end 246 includes a head portion 242 having an outer surface that cooperates with the sleeve 250 to form a fluid tight seal when the closure 200 is in a closed position. Preferably, the head portion 242 tapers radially inward toward the elongated member 244, such that the sealing member 257 can form a fluid tight seal with the second end 246 of the poppet member 240. It will be appreciated that the head portion 242 and elongated member 244 may employ other configurations such as the structure of the head portion 42 and elongated member 44 in the poppet 40 illustrated above in FIGS. 1–3C. Further, the head portion may include circumferential rim 246a about the outer surface of the poppet 240 defining a recess area 246b. It will be appreciated the second end 246 may be other configurations such as the head portion 42 described above.

As discussed above for the sleeve 50, the sleeve 250 is retained within the housing 230 when the sealing member 257 is in contact with the second end 246 and head portion 242 of the poppet 240. Preferably, assembly of the sleeve 250 is accomplished by a snap fit, by forcibly overcoming the interference between the opening 252 including the sealing member 257 of the sleeve 250 and the diameter of the second end 246 of the poppet 240. Preferably, the force required to assemble the sleeve 250 may be higher than the forces resulting from hydraulic pressure of the fluid in the fluid source against the sleeve 250, so that the sleeve 250 is properly retained.

The sleeve 250 includes a first end 253 and a second end 255 that define a sidewall 256 therebetween. The sidewall 256 defines an inner surface 256a adapted for inserting a biasing member 260 within the sleeve 250. The second end 255 includes a sealing structure 259 residing about the outer sidewall 256 for forming a fluid tight seal between the sleeve 250 and the housing 230. Further, the second end 255 includes an opening 252 coaxial and in fluid communication with the flow passage 290. A sealing member 257 resides about the circumference defined by the opening 252 for forming a fluid tight seal with the second end 246 of the poppet member 240. Preferably, the sleeve 250 including the sealing structure 259 and the sealing member 257 is an integrally molded structure. More preferably, the sealing structure 259 and the sealing member 257 are integrally molded lip seals.

The biasing member 260 is insertable within the housing 230. The biasing member 260 abuts a portion of each of the leg portions 236 at one end proximate the first end 232 of the housing 230, and abuts a surface 258 of the sleeve 250 proximate the second end 255 of the sleeve and proximate the second end 234 of the housing 230. As above, the biasing member 260 may be, but is not limited to a coiled spring. The sleeve 250 is movable within the housing 230. The sleeve 250 is normally biased toward the second end 234 of the housing 230 such that the closure 200 is in a closed position, and is movable toward the first end 232 of the housing 230 so as to actuate the closure 200 in an open position when mated, for instance with a mating coupler such as coupler 100 in FIGS. 3A–3C. The connection of the closure 200 with a coupler and fluid system, such as coupler 100 and fluid system 11, and the operation of the sleeve 250 and biasing member 260 are identical to the description above, and are not further discussed.

As shown in FIG. 5B the poppet member 240 is inserted within the housing 230 but not yet retained, and in FIG. 5C the poppet member 240 is in its retained position. Preferably, the poppet member 240 is fixed in a stationary position within the retaining structure 233 of the housing 230. In FIG. 5B, the inner side surface 247a of the hole 247 at the first end 245 of the poppet member 240 is shown before being welded to retain the poppet member 240 within the housing 230. FIG. 5C shows the inner side surface 247a flared outward such that the poppet member 240 is formed with a welded end and is retained at the retaining structure 233. FIG. 5C illustrates the poppet member 240 having a welded flared end 245a defined by the hole 247 and inner side surface 247a. The welded end 245a resembles a mushroom shaped end welded to the retaining structure 233, with the inner side surface essentially peeled outward.

FIGS. 6–9B individually illustrate the housing 230, sleeve 250, poppet member 240 and biasing member 260, respectively.

As described above in the embodiment of FIGS. 1–4, the housing 230, poppet 240, and sleeve 250 may be formed of chemically resistant material suitable for aggressive chemical fluid flow. Further, the housing 230, poppet 240, and sleeve 250 may be an injection molded plastic material. In addition, the sleeve 250 may be formed of at least a partially flexible plastic material as opposed to the housing 230 and poppet 240, which may be formed of a substantially rigid plastic material. This plastic on plastic configuration, defined by the sealing member 257 of the sleeve 250 and the second end 246 of the poppet 240, allows the integrity of the seal within the components of the closure 200 to be maintained. Such a configuration prevents spill of product from a source, and prevents leakage and/or spill of product still remaining within the passageway of the closure 200 when the closure 200 and a coupler are disconnected. Further, a convenient and cost effective closure may be provided, that is made of plastic and has integrally formed sealing members and structures and a minimum number of parts required for assembly.

As above, the present invention provides a closure valve with a simplified sealing structure. As above, the plastic on plastic configuration of the housing and poppet on the sleeve having the sealing structure and sealing member, such as flexible lip seals, provide an adequate seal that may be integrally molded. This configuration may prevent the closure from degradation and erosion thus preserving the seal properties of the closure and its overall function. In addition, the integrally molded seal allows the closure valve to be produced in a cost effective manner, and also may be disposable after use. The sealing member retains the sleeve with an adequate seal within the housing. Further, when in the closed position the closure prevents spill of product from the fluid source, and prevents spill of product remaining in the flow passageway of the closure.

Having described the embodiments of the present invention, modifications and equivalents may occur to one skilled in the art. It is intended that such modifications and equivalents shall be included with the scope of the invention.

We claim:

1. A closure valve comprising:
a housing having first and second ends defining a flow passageway;
a poppet member disposed within said flow passageway and retained within said housing; and
a sleeve disposed within said housing and defining an opening in fluid communication with said poppet member and flow passageway of said housing; said sleeve being biased so that said closure valve is in a normally closed position and said sleeve being movable so as to actuate said closure valve to an open position, said sleeve including a flexible sealing member disposed about a circumference of said sleeve at said opening of said sleeve, said sealing member forming a fluid tight seal with said poppet member in said closed position, and said sleeve including a flexible sealing structure disposed about a circumference of said sleeve defined by an outer sidewall of said sleeve, said sealing structure forming a fluid tight seal with said housing, said sealing member and said sealing structure being integrally molded lip seals that respectively define a wall structure extending from each circumference in a direction substantially as said flow passageway, whereby said sleeve is a one-piece molded part.

2. The closure valve according to claim 1, wherein said poppet member is telescopically engaged with said first end of said housing.

3. The closure valve according to claim 1, wherein said poppet member defining a plurality of openings in fluid communication with said flow passageway of said housing and said opening of said sleeve.

4. The closure valve according to claim 1, wherein said sleeve is telescopically insertable into said second end of said housing.

5. The closure valve according to claim 1, wherein said sealing member of said sleeve cooperates with said poppet in an interference fit so as to retain said sleeve within said housing when said sealing member is in contact with said poppet.

6. The closure valve according to claim 1, wherein said sealing member of said sleeve is formed of a flexible plastic material, and said poppet is formed of a rigid plastic material, said flexible plastic material and said rigid plastic material communicate in a plastic on plastic seal configuration.

7. The closure valve according to claim 1, wherein said poppet member is retained within said housing proximate said first end, said housing including a retaining structure for retaining said poppet member to said housing, said retaining structure is connected to said housing through a plurality of leg portions extending radially from said retaining structure to a sidewall of said housing.

8. The closure valve according to claim 7, wherein said retaining structure including an aperture defining a tapered surface, said tapered surface cooperating with a tapered surface of said poppet member when said poppet member is inserted into said retaining structure.

9. The closure valve according to claim 8, wherein said tapered surface of said poppet member is disposed proximate a first end of said poppet member, said first end including a hole defining a side surface, said hole and side surface forming a welded end when said poppet member is retained within said housing.

10. The closure valve according to claim 9, wherein said poppet member is fixed in a stationary position to said housing.

11. The closure valve according to claim 1, wherein said sleeve is formed of an at least partially flexible plastic material, and said housing and poppet member are formed of a substantially rigid plastic material, wherein said material of said sleeve and said materials of said housing and poppet member communicate in a plastic on plastic seal configuration.

12. The closure valve according to claim 1, wherein said poppet member is fixed in a stationary position to said housing.

* * * * *